United States Patent [19]

Vieri

[11] 3,894,185

[45] July 8, 1975

[54] DIGITAL RUN LENGTH SYNCHRONIZER

[75] Inventor: Bruno J. Vieri, Dallas, Tex.

[73] Assignee: Xerox Corporation, Stamford, Conn.

[22] Filed: Mar. 6, 1974

[21] Appl. No.: 448,592

[52] U.S. Cl. ... 178/69.5 F; 178/DIG. 3; 179/15 BS; 235/92 EV

[51] Int. Cl. ... H04l 7/00

[58] Field of Search ..... 178/69.5 R, 69.5 F, DIG. 3; 179/15 BA, 15 BS, 15 BV; 235/92 T, 92 PE, 92 EV

[56] References Cited

UNITED STATES PATENTS

| | | | |
|---|---|---|---|
| 3,061,672 | 10/1962 | Wyle | 178/DIG. 3 |
| 3,294,896 | 12/1966 | Young, Jr. | 178/DIG. 3 |
| 3,488,440 | 1/1970 | Logan et al. | 178/69.5 R |
| 3,549,804 | 12/1970 | Greenspan et al. | 178/69.5 R |
| 3,809,820 | 5/1974 | Sullivan | 179/15 BS |

*Primary Examiner*—Malcolm A. Morrison
*Assistant Examiner*—Errol A. Krass

[57] ABSTRACT

Apparatus and method for synchronizing run lengths in a two-level digital facsimile system. A reversible counter is pulsed at a multiple of the system clock rate, the up count being started upon the occurrence of binary one information and stopped after reaching a predetermined count upon the occurrence of a system clock pulse. This system clock pulse is utilized to provide a binary one output signal. On a transition of the input signal to a binary zero state, the reversible counter is switched to its countdown state. After reaching the predetermined count, the following system clock pulse is utilized to change the output to the binary zero state. This eliminates variations in run lengths which occur when transitions have different phases with respect to the system clock.

7 Claims, 4 Drawing Figures

DIGITAL RUN LENGTH SYNCHRONIZER

BACKGROUND OF THE INVENTION

This invention relates to digital systems and, more particularly, to systems wherein an analog signal is quantized into a two-level signal.

This invention finds particular utility in facsimile systems. An analog facsimile signal may be quantized to two levels, but it is still essentially asynchronous because the signal transitions occur randomly with respect to the regular clock of a synchronous digital system. In conventional digital transmission systems, the analog facsimile signal is first quantized into a two-level signal which is then sampled by the system clock to produce a binary digital signal. This procedure has the disadvantage that it degrades the facsimile images reproduced by the system because a run of arbitrary length at one level will be represented inconsistently for different phase relationships with the system clock. For example, a run length that is 2.2 times the clock period will be quantized into either two or three clock periods, depending on the phase relationship between the signal transitions and the clock pulses. This type of error has been found especially objectionable in short black runs, even at clock rates equivalent to 200 elements per inch. It would therefore be desirable to provide a method, and apparatus operating in accordance therewith, for removing variations in run lengths which arise solely from phasing variations.

SUMMARY OF THE INVENTION

In accordance with principles illustrative of this invention, a method, and apparatus operating in accordance therewith, is provided for synchronizing a two-level signal with a system clock while reducing arbitrary variations in run length. The start of each clocked binary one run is determined in essentially the usual way. The displacement error between the actual start of the run and the start of the clocked run is stored in a reversible counter. At the end of the actual run, the counter is used in reverse to measure the displacement error and to establish the end of the clocked run in such a way that the synchronous run length is within one half clock period of the asynchronous run length.

BRIEF DESCRIPTION OF THE DRAWING

The foregoing will be readily apparent upon reading the following description in conjunction with the drawing in which.

DESCRIPTION OF THE PREFERRED EMBODIMENT

Figure 1:
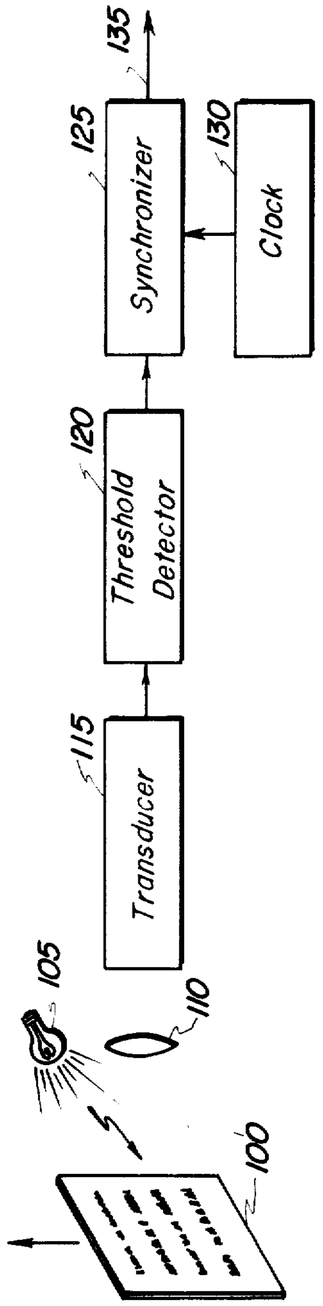
FIG. 1 depicts a general block diagram of a facsimile system in which the present invention finds particular utility.

Turning now to the drawing, depicted in FIG. 1 is a block diagram of a portion of a general facsimile system in which the principles of this invention may be applied. Document 100 is illuminated by light source 105. The reflected light passes through lens 110 and impinges on transducer 115. The mechanical relationship of the elements in the illustrative facsimile system causes the combination of document 100, light source 105, lens 110 and transducer 115 to move such that elemental lines of document 100 are scanned. The particular apparatus for performing this scanning function does not form a part of this invention. One particular arrangement may be that utilized in the Telecopier III facsimile transceiver manufactured by Xerox Corporation in which light 105, lens 110, and transducer 115 are mounted on a rotating turret which spins past document 100 or, alternatively, light 105, lens 110, and transducer 115 may be mounted on a carriage and document 100 may be mounted on a rotating drum, such as is the case with the 400 Telecopier facsimile transceiver manufactured by Xerox Corporation. Other arrangements may be utilized without departing from the spirit of this invention.

Transducer 115 functions to take reflected light from document 100 and convert this light into an electrical signal which is an analog of the reflected light value. For example, as the white background of the document is scanned, transducer 115 supplies a voltage at a first level and as a black element is scanned transducer 115 supplies a voltage at a second level, gray elements providing voltages between the first and second levels. The output of transducer 115 is supplied to threshold detector 120 which converts the analog signal from transducer 115 into a two-level signal. Such a threshold detector may be, for example, the well-known Schmitt trigger device which provides a logic zero when the input thereto is less than a predetermined threshold and provides a logic one when the input is above the predetermined threshold detector value. The output of threshold 120 is applied to synchronizer 125 which also receives an input from clock 130. The input to synchronizer 125 from threshold detector 120 is a two-level signal which is asynchronous with respect to the system clock 130. This is because the black-to-white and white-to-black transitions on document 100 occur randomly with respect to the system clock. The function of synchronizer 125 is to provide on line 135 a two-level signal having transitions coinciding with clock 130.

Figure 2:
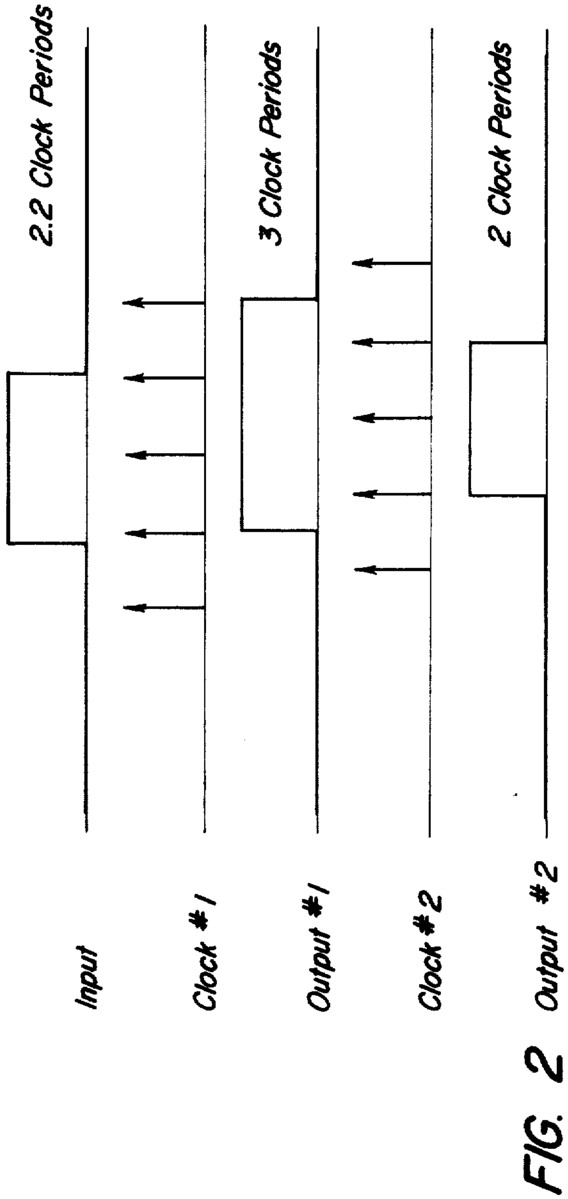
FIG. 2 depicts timing charts showing examples of prior synchronizing illustrating the problems which this invention overcomes.

Prior art synchronizers typically "remembered" a transition at their input and then changed the output signal at the next clock pulse. A problem with this approach is that an input run of arbitrary length will be represented inconsistently for different phase relationships with the system clock. An example of this is shown in FIG. 2. Depicted in FIG. 2 is an arbitrary input signal of duration 2.2 clock periods. With respect to Clock No. 1, an Output No. 1 will result, of duration 3 clock periods. With respect to Clock No. 2, of different phase from Clock No. 1, an Output No. 2 will result with a duration of 2 clock periods. This type of inconsistency has been found especially objectionable in short runs. The present invention provides an improved synchronizer which eliminates these inconsistencies.

Figure 3:
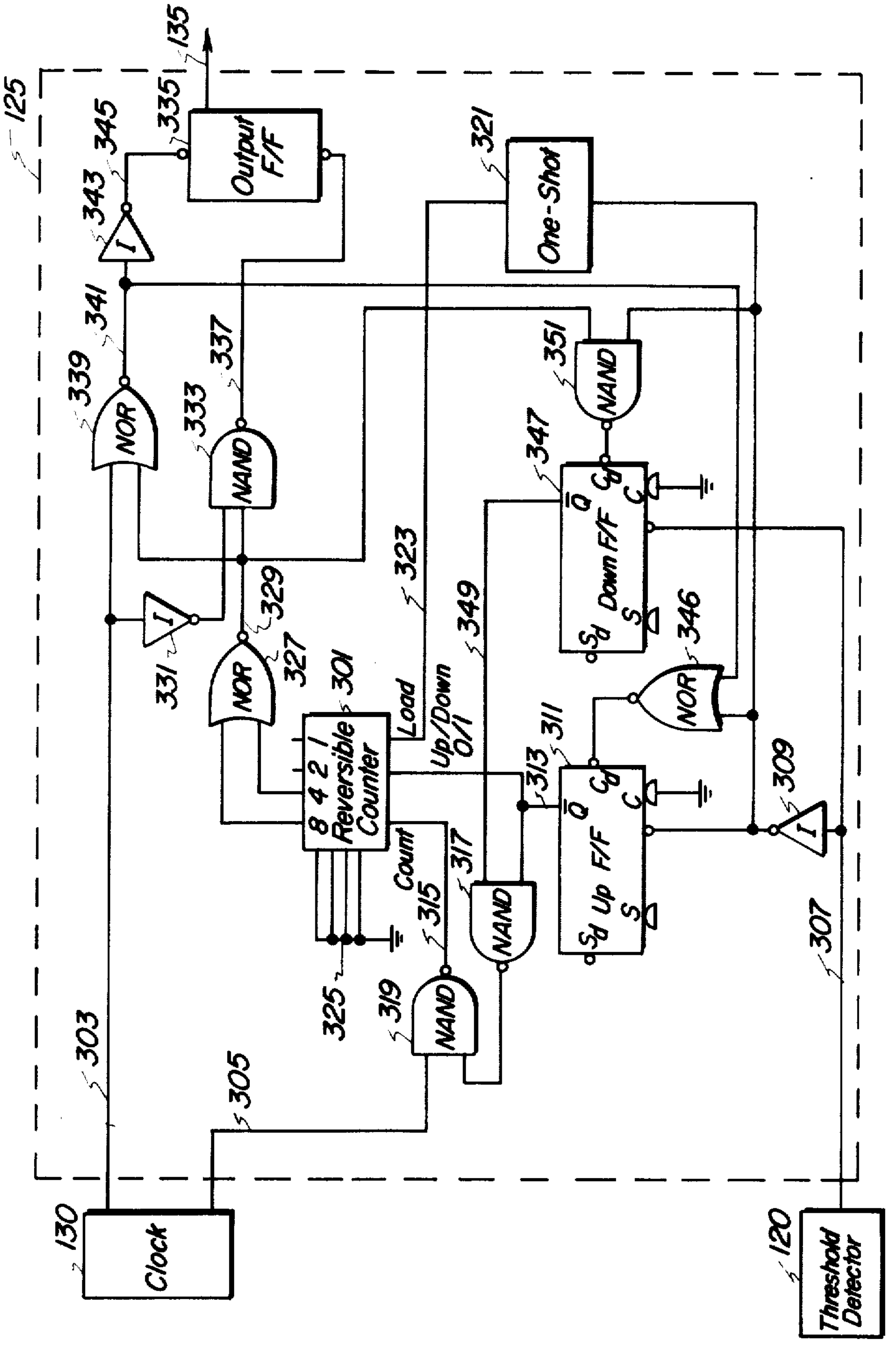
FIG. 3 depicts a schematic logic diagram of an illustrative circuit operating in accordance with the principles of this invention.
Figure 4:
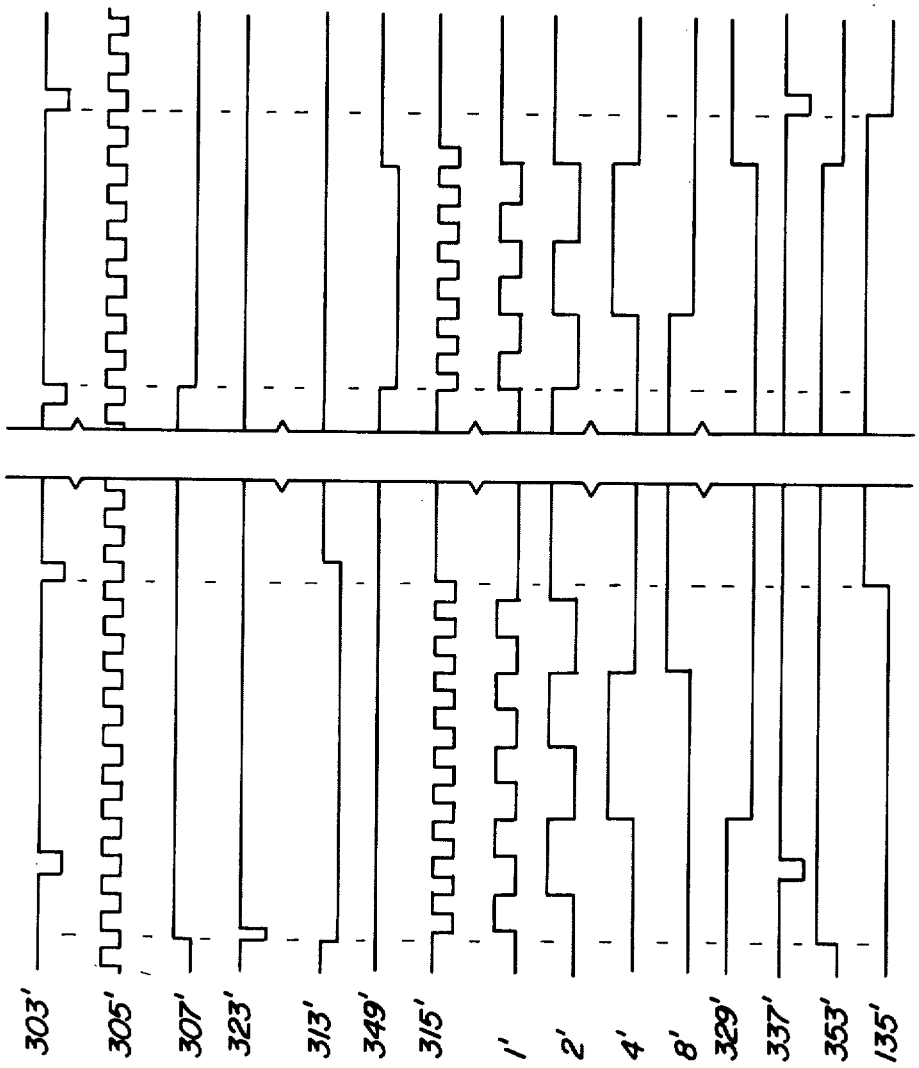
FIG. 4 depicts illustrative waveforms at various points of the circuit shown in FIG. 3.

Turning now to FIG. 3, depicted therein is a logic diagram of an improved synchronizer circuit 125 operating in accordance with the principles of this invention. The following description of the circuit shown in FIG. 3 should be read in conjunction with FIG. 4, which shows illustrative signals at various points in the circuit of FIG. 3, the use of primed reference notations in FIG.

4 referring to the signals on the corresponding unprimed terminals, or leads, in FIG. 3.

In the following discussion, the terms ZERO and ONE are used to describe binary logic levels. The term ZERO will mean no signal or ground and the term ONE will refer to a signal at a positive voltage level. The logical elements utilized in the circuit of FIG. 3 are for the most part NAND and NOR gates. NAND gates have a ZERO output if, and only if, all of the inputs thereto are at ONE. Otherwise, the output of a NAND gate is a ONE. NOR gates have a ONE output if, and only if, all of the inputs thereto are at ZERO. Otherwise, the output of a NOR gate is a ZERO. Another logic element shown in the circuit of FIG. 3 is an inverter which has a ONE output if its input is a ZERO and has a ZERO output if its input is a ONE. Also shown in the circuit of FIG. 3 are flip-flops which change states on negative transitions of input signals. The one-shot circuit shown in FIG. 3 provides a single output pulse upon a negative transition of the signal applied to its input. The reversible counter shown in FIG. 3 will either increment (count up) or decrement (count down) in response to clock pulses applied thereto, dependent upon whether the signal applied to a control input is either a ZERO or a ONE. Such a counter may be, for example, Texas Instruments SN7491, or equivalent.

The circuit shown in FIG. 3 operates in accordance with the principles of this invention to convert an asynchronous two-level signal received over line 307 from threshold detector 120 into a synchronous two-level signal on line 135 in accordance with clock signals supplied by clock circuit 130. The circuit shown in FIG. 3 operates such that a ONE level signal from threshold detector 120 having an arbitrary duration, results in a ONE level signal on line 135 whose duration is closest to an integral number of clock periods. As will be explained more fully hereinafter, reversible counter 301 is utilized to store the displacement error between the start of an input run and the next succeeding clock pulse. That clock pulse initiates an output signal on line 135. At the end of the input run, counter 301 is reversed and when the net count falls below a predetermined value the next system clock pulse terminates the run on line 135.

Clock 130 supplies two signals to synchronizer 125. The first signal is the system clock applied to line 303. This signal is at a logical ONE level with pulses to a logical ZERO level. Clock 130 also supplies fast clock pulses on lead 305. These latter pulses are at a rate which is an integral multiple of the pulse rate of the system clock on line 303. For illustrative purposes, the pulse rate of the pulses applied to line 305 will be assumed to be eight times the pulse rate of the system clock pulses applied to line 303.

The signal from threshold detector 120 on line 307 is normally at a ZERO logic level when the background of document 100 is being scanned. When a black area on document 100 is scanned, the signal on line 307 changes to a logic ONE. This logic ONE is inverted by inverter 309, the negative-going transition causing up flip-flop 311 to set, changing the signal on line 313 from a logic ONE to a logic ZERO. This logic ZERO signal on line 313 conditions up/down counter 301 to count in the up direction upon receipt of pulses on line 315. With line 313 at a logic ZERO, the output of NAND gate 317 becomes a logic ONE, thereby causing the output of NAND gate 319 to be the inverse of the fast clock pulses on line 305.

When the input signal on line 307 changed from a ZERO to a ONE, inverter 309 applied the negative transition to one-shot multivibrator 321, which caused a negative pulse to be applied to reversible counter 301 over line 323. This input to reversible counter 301 loaded counter 301 with the values applied to input terminals 325. Input terminals 325 are connected to ground, the ZERO logic level, so that the pulse on line 323 acts to reset counter 301 to zero. The pulses applied to line 315 from the fast clock on line 305 then cause counter 301 to begin incrementing. NOR gate 327 normally has its output on line 329 at a logic ONE level. When counter 301 reaches a count of 4, the output of NOR gate 327 on line 329 goes from a ONE to a ZERO. When the signal on line 329 had been ONE, this allowed the system clock pulses on line 303 to pass through inverter 331 and NAND gate 333 to clear output flip-flop 335 via line 337. However, as long as the count in counter 301 is greater than or equal to 4, the signal on line 329 is at a logic ZERO and no pulses are applied to clear output flip-flop 335. The next clock pulse on line 303 after counter 301 has reached a count of 4 passes through NOR gate 339 to line 341, through inverter 343, to line 345 where it then sets output flip-flop 335. The signal on line 135 then changes to a logical ONE. This same system clock pulse which set flip-flop 335 is also transmitted through NOR gate 346 to clear up flip-flop 311, thereby stopping counter 301 and conditioning counter 301 to count down when it next receives count pulses on line 315.

At this point, the state of the circuit of FIG. 3 remains the same until the input signal on line 307 changes from a ONE to ZERO. As shown by the illustrative waveforms in FIG. 4, at this point counter 301 is storing a count of 10, up flip-flop 311 is cleared, and output flip-flop 335 is set. When the input signal on line 307 changes from a ONE to a ZERO, this sets down flip-flop 347, changing the level on line 349 from ONE to ZERO. This causes the output of NAND gate 317 to go from ZERO to ONE, thereby enabling NAND gate 319 to pass the fast clock pulses on line 305 to line 315. Since counter 301 is conditioned by the logic ONE signal on line 313 to count down, the pulses on line 315 start decrementing counter 301 from a count of 10. When the count in counter 301 drops below 4, the signal on line 329 goes from ZERO to ONE. This ONE signal on line 329 in conjunction with the ONE output of inverter 309 causes the output of NAND gate 351 on line 353 to become a ZERO, thereby clearing down flip-flop 347, placing a logic ONE signal on line 349. This logic ONE signal on line 349 in conjunction with the logic ONE signal on line 313 causes the output of NAND gate 317 to drop to a ZERO, thereby disabling NAND gate 319, stopping counter 301. Since line 329 is at a logic ONE level, the next system clock pulse on line 303 is inverted by inverter 331 and causes the output of NAND gate 333 on line 337 to become a logic ZERO, thereby clearing output flip-flop 335 and causing the signal on output line 135 to go from a logic ONE to a logic ZERO. Thus, as shown by the illustrative waveforms of FIG. 4, the asynchronous input signal on line 307 is converted to a synchronous output signal on line 135.

In summary, the operation of the illustrative embodiment is as follows:

1. At the beginning of a ONE run, counter 301 resets, up flip-flop 311 sets and the count begins;

2. After one-half system clock period (count = 4), the next system clock pulse sets output flip-flop 335, resets up flip-flop 311 and stops the count;

3. At the end of a ONE run, down flip-flop 347 sets, and decrementing of counter 301 begins. Up flip-flop 311 resets, if it has not reset already (run length less than one system clock period); and 4. When the count falls below 4, down flip-flop 347 resets and the next system clock pulse resets output flip-flop 335.

Accordingly, there has been shown an illustrative arrangement for converting an asynchronous two-level signal into a synchronous two-level signal. It is understood that the above-described arrangement is merely illustrative of the application of the principles of this invention. Numerous other arrangements may be devised by those skilled in the art without departing from the spirit and scope of this invention. While the above-described arrangement has been shown as being utilized in a facsimile system, it is understood that this is not intended to be limiting and that the principles of this invention may be utilized in any environment where it is desired to synchronize an asynchronous two-level signal.

What is claimed is:

1. Apparatus for converting an asynchronous binary input signal into a binary output signal having transitions synchronous with a clock signal comprising memory means responsive to a first transition of said input signal and pulses of said clock signal for storing an indication of the time displacement between said first transition and a succeeding clock pulse, means initiating an output signal synchronous with a clock pulse when said stored displacement is greater than a predetermined amount, means responsive to a second transition of said input signal for controlling said memory means to decrement said stored indication by the time displacement between said second transition and a succeeding clock pulse, and means terminating said output signal synchronous with a clock pulse when the decremented indication is less than said predetermined amount.

2. The apparatus of claim 1 further including pulse means operating at an integral multiple of the clock rate and wherein said memory means comprises a reversible counter operatively connected to said pulse means.

3. The apparatus of claim 2 wherein said integral multiple is an even number and said predetermined amount is equivalent to one half the time between successive clock pulses.

4. Apparatus for converting an asynchronous binary input signal into a binary output signal having transitions synchronous with a clock signal comprising a reversible counter, incrementing means responsive to a first transition of said input signal for incrementing said reversible counter, output means responsive to the content of said reversible counter for providing an output signal synchronous with a clock pulse when the content of said counter is greater than a predetermined amount, decrementing means responsive to a second transition of said input signal for decrementing said counter, and means controlling said output means to terminate said output signal synchronous with a clock pulse when the content of said counter is less than said predetermined amount.

5. The apparatus of claim 4 further including pulse means operating at an integral multiple of the clock rate and operatively connected to said reversible counter.

6. The apparatus of claim 5 wherein said pulse means operates at eight times the clock rate and said predetermined amount is equal to four.

7. A method for converting an asynchronous binary input signal into a binary output signal having transitions synchronous with a clock signal comprising the steps of a. storing an indication of the time displacement between a first transition of the input signal and a succeeding clock pulse, b. providing an output signal synchronous with a clock pulse when the stored displacement is greater than a predetermined amount, c. decrementing the stored indication by the time displacement between a second transition of the input signal and a succeeding clock pulse, and d. terminating the output signal synchronous with the clock pulse when the decremented indication is less than the predetermined amount.

* * * * *